United States Patent
Diazzi et al.

(10) Patent No.: US 11,255,671 B2
(45) Date of Patent: Feb. 22, 2022

(54) APPARATUSES AND METHODS FOR PROCESSING A SENSOR SIGNAL

(71) Applicant: Robert Bosch GmbH, Stuttgart (DE)

(72) Inventors: Francesco Diazzi, Munich (DE); Andrea Visconti, Munich (DE); Ruslan Khalilyulin, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 16/111,547

(22) Filed: Aug. 24, 2018

(65) Prior Publication Data

US 2019/0078888 A1    Mar. 14, 2019

(30) Foreign Application Priority Data

Sep. 12, 2017   (DE) .......................... 102017216007.1

(51) Int. Cl.
   *G01C 19/5776*   (2012.01)
   *G01C 19/5712*   (2012.01)

(52) U.S. Cl.
   CPC ..... *G01C 19/5776* (2013.01); *G01C 19/5712* (2013.01)

(58) Field of Classification Search
   CPC .................. G01C 19/5776; G01C 19/5712
   USPC ....................................................... 702/189
   See application file for complete search history.

(56) References Cited

U.S. PATENT DOCUMENTS

| | | | | |
|---|---|---|---|---|
| 5,093,751 A | * | 3/1992 | Yuki ................. | G11B 20/1816 360/25 |
| 6,266,422 B1 | * | 7/2001 | Ikeda ................. | G10L 21/0208 381/71.11 |
| 6,294,952 B1 | * | 9/2001 | Kato ................... | H03D 1/2245 329/306 |
| 2003/0035549 A1 | * | 2/2003 | Bizjak ................. | H03G 7/002 381/56 |
| 2010/0074365 A1 | * | 3/2010 | Ladebeck ............ | G01D 3/036 375/285 |
| 2012/0049869 A1 | * | 3/2012 | Kremin ................ | G01R 29/26 324/679 |
| 2017/0023630 A1 | * | 1/2017 | Zettler ............... | G01R 31/2829 |

FOREIGN PATENT DOCUMENTS

EP      2 647 955 A2    10/2013

* cited by examiner

*Primary Examiner* — Eman A Alkafawi
*Assistant Examiner* — Aeysha N Sultana
(74) *Attorney, Agent, or Firm* — Norton Rose Fulbright US LLP; Gerard Messina

(57) ABSTRACT

Apparatuses and methods are described for processing the sensor signal of a sensor component, a noise signal that is generated as a function of specific properties of an interference signal component of the sensor signal and/or of specific properties of a temperature signal of a temperature sensor being mixed into a useful signal component of the sensor signal.

10 Claims, 4 Drawing Sheets

APPARATUSES AND METHODS FOR PROCESSING A SENSOR SIGNAL

CROSS REFERENCE

The present application claims the benefit under 35 U.S.C. § 119 of German Patent Application No. DE 102017216007.1 filed on Sep. 12, 2017, which is expressly incorporated herein by reference in its entirety.

FIELD

The present invention relates to apparatuses and methods for processing the sensor signal of a sensor component; the sensor component can in particular be a microelectromechanical (MEMS) component.

BACKGROUND INFORMATION

Sensor components for sensing physical variables, such as accelerations, typically first output analog sensor signals. Such sensor signals encompass a useful signal component as well as additional signal components, for example an interference signal component, analog signal noise, or measurement artifacts.

Efforts have therefore been made to process sensor signals to yield output signals that contain substantially exclusively the useful signal component; ideally, otherwise at most a low-amplitude white noise is present.

"White noise" refers here to a noise having a constant power density spectrum in a specific frequency region. White noise having a limited bandwidth is often used in engineering and the sciences to model interference in an otherwise ideal model, i.e., to describe random interference in a transfer channel.

European Patent Application No. EP 2 647 955 A2, for example, describes apparatuses and methods for extinguishing a quadrature component in sensor signals of a microelectromechanical system (MEMS), for example a MEMS gyroscope.

The quadrature component is also referred to as a "quadrature signal," "Q data," or "Q data signals," and plays a role, for example, in the in-phase and quadrature (IQ) method. In this method, a signal to be demodulated is directed along two paths: the one demodulation path is carried out using the original phase ("in-phase") and yields the in-phase data, and the second path is carried out using a 90° phase-shifted reference frequency and yields the quadrature data.

SUMMARY

In accordance with an example embodiment of the present invention, an apparatus for processing the sensor signal of a sensor component is provided, the sensor signal encompassing at least one useful signal component,
 having a selection circuit for the useful signal component;
 having a temperature sensor; and
 having a processing circuit having means for generating a noise signal that is mixed into the at least one useful signal component,
 wherein the processing circuit at least encompasses:
 a noise generator having variable operating parameters; and
 means for analyzing the properties of the temperature signal of the temperature sensor; and
 configuration means for choosing and setting the operating parameters of the noise generator as a function of the properties of the temperature signal.

An example apparatus for processing the sensor signal of a sensor component is also furnished, the sensor signal encompassing at least one useful signal component and at least one interference signal component,
 having a selection circuit having means for separating the at least one useful signal component from the at least one interference signal component; and
 having a processing circuit having means for generating a noise signal that is mixed into the at least one useful signal component,
 wherein the processing circuit at least encompasses:
 a noise generator having variable operating parameters; and
 means for analyzing the properties of the interference signal component; and
 configuration means for choosing and setting the operating parameters of the noise generator as a function of the properties of the interference signal component.

An "interference signal component" is to be understood, for example, as a component of the sensor signal which represents information that is undesired, meaningless, or redundant by comparison with the useful signal component. In the IQ method, for example, the I data can be referred to as a useful signal component and the Q data as an interference signal component.

The means for analyzing the properties of the temperature signal, the means for analyzing the properties of the interference signal component, and/or the configuration means for choosing and setting the operating parameters of the noise generator can each be implemented entirely by hardware (e.g., by way of an application-specific integrated circuit (ASIC) or a microcontroller or a logic circuit), entirely by software (i.e., by way of program code, executed on a processor of the apparatus, which is stored in a nonvolatile memory of the apparatus), or partly by hardware and partly by software.

The selection circuit, the processing circuit, and/or the sensor component can be disposed or integrated on a common substrate, or can be implemented by way of separate components connected to one another, for example, via wire bonds.

An example method for processing the sensor signal of a sensor component is furthermore furnished, the sensor signal encompassing at least one useful signal component, in which a temperature signal is detected in parallel with the sensor signal;
 in which the temperature signal is analyzed;
 in which a noise signal is generated as a function of the properties of the temperature signal; and
 in which that noise signal is mixed into the useful signal component.

Also furnished is a method for processing the sensor signal of a sensor component, the sensor signal encompassing at least one useful signal component and at least one interference signal component,
 in which the at least one useful signal component and the at least one interference signal component are separated;
 in which the at least one interference signal component is analyzed;
 in which a noise signal is generated as a function of the properties of the at least one interference signal component; and in which that noise signal is mixed into the useful signal component.

In order to cover undesired measurement artifacts in the sensor signal, for example individual peaks in the sensor signal which have no real physical counterpart, a noise signal is mixed into the useful signal component. This noise signal can also be referred to as a "dithering" signal. "Dithering" describes a method that, for example in digital audio technology, can mitigate the effect of quantization errors. Such errors occur both in digitization and in digital computation operations using signals. What occurs, instead of troublesome distortions, is a less irritating uniform noise that is similar to that of an analog amplifier.

Undesired measurement artifacts in the form of sudden peaks ("outliers") can also be referred to as "idle tones," since such peaks can also occur in the context of the digitization of analog audio signals and correspond to undesired tones in the digital audio signal which are not present in the original audio signal.

The realization on which the present invention is based is the fact that it is advantageous to mix into the useful signal component a noise signal that is exactly adapted to the specific present circumstances, and the manner in which that can be achieved.

It is preferred in general if the output signal that is outputted by the apparatus and that encompasses the useful signal component contains a white noise that has the lowest possible average amplitude, so that the useful signal component emerges particularly clearly in the output signal, i.e., if the output signal has a particularly high signal-to-noise ratio.

A further part of the present invention therefore consists in bringing about in the output signal a white noise that has the lowest possible amplitude in the given circumstances, i.e., for example an amplitude that is large enough to cause any measurement artifacts to be submerged in the white noise.

In a first variant, for example, the noise signal can be adapted to an ambient temperature, and/or a temperature of the sensor component, which is detected with the aid of a temperature sensor.

The outputs of amplifier circuits, or of other signal-carrying or signal-processing components, can be affected at comparatively high temperatures by comparatively greater noise which comes comparatively closer to a white noise. In this case (as compared with the case of a comparatively lower temperature), for example, a noise signal having a comparatively lower amplitude can be sufficient to achieve overall a desired uniformity (e.g., a desired approximation to white noise) of the components present in the output signal alongside the useful signal component.

Even if a noise that may already present in the sensor signal is already a white noise or comes desirably close to being a white noise, addition of the noise signal could in principle be omitted, or a noise signal having a lower amplitude might suffice. Such a noise can be represented entirely or partly by the interference signal component. The greater the deviation of the interference signal component from the desired white noise, the greater the amplitude and/or degree of structuring required for the noise signal that is mixed in.

The present invention takes the above considerations into account by the fact that it uses the interference signal component and/or the temperature signal and, on the basis thereof, mixes an optimally adapted noise signal into the useful signal component so as to obtain an optimally achievable, optimally processable output signal.

Advantageous embodiments and refinements are described herein with reference to the Figures.

According to a preferred embodiment of the present invention, the sensor signal encompasses both a useful signal component and an interference signal component. The apparatus according to the present invention is furthermore also equipped in this case with at least one temperature sensor. The configuration means of the processing circuit are then designed to take into account both the properties of the temperature signal and the properties of the interference signal component when the operating parameters of the noise generator are chosen and/or set. The operating parameters of the noise generator preferably determine the properties with which the noise signal is generated. In other words, the processing circuit can be designed to generate the noise signal based on the analyzed (i.e., determined) properties both of the temperature signal and of the interference signal component. A noise signal that is even better adapted to the presently existing conditions can thereby be generated.

According to a further preferred refinement, the apparatus encompasses at least one analog-digital converter for the useful signal component. Mixing of the noise signal generated by the noise generator into the useful signal component preferably occurs in the signal flow before or at the analog-digital converter. It is thereby possible to prevent measurement artifacts from resulting in artifacts (e.g., peaks or "idle tones") in the digitized sensor signal upon digitization of the sensor signal by the analog-digital converter, or to reduce the probability thereof.

According to a further preferred refinement, the means analyze the signal amplitude, frequency distribution, phase, change over time in the signal amplitude, and/or the noise portion of the temperature signal and/or of the interference signal component. The operating parameters of the noise generator can be adapted more precisely based on the analyzed variables.

According to a further preferred refinement, the manner in which the noise signal is generated (noise signal generation), the frequency distribution of the noise signal, filter parameters for the noise signal, gain factors, and/or the noise output power of the noise generator are variable with the aid of, in particular by way of, the configuration means. A noise signal having particularly advantageous properties can thus be generated.

According to a further preferred refinement, the sensor component encompasses at least one oscillatably mounted element which is excited to oscillate in a first spatial direction X and which is then caused to oscillate in a second spatial direction Y as a result of the measured variable to be detected, the second spatial direction Y being oriented substantially perpendicularly to the first spatial direction X, and the motion of the at least one oscillatably mounted element in the Y direction being detected as an electrical sensor signal;

the sensor signal encompassing an in-phase signal as a useful signal component and a quadrature signal as an interference signal component;

the in-phase signal substantially representing the sensor signal portion to be attributed to the measured variable, and the quadrature signal substantially representing a sensor signal portion that is to be attributed to an undesired excitation of the oscillatably mounted element in the Y direction.

According to a preferred refinement of the method described, both the properties of the temperature signal and the properties of the at least one interference signal component are taken into account upon generation of the noise signal. A noise signal that is even better adapted to the presently existing conditions can thereby be generated.

According to a further preferred refinement, the at least one useful signal component can be analog-digital converted, the noise signal being mixed into the useful signal component preferably before analog-digital conversion.

BRIEF DESCRIPTION OF THE DRAWINGS

The present invention will be explained in further detail below with reference to the exemplifying embodiments depicted in the schematic Figures.

In all the Figures, identical or functionally identical elements and apparatuses are labeled with the same reference characters unless otherwise indicated.

DETAILED DESCRIPTION OF EXAMPLE EMBODIMENTS

Principles, manners of operation, and operations will be described below substantially with reference to apparatuses. The operations described also illustrate methods that can be carried out independently of the concretely described structural constituents of those apparatuses, as described above. All variants and modifications described with reference to apparatuses are thus also applicable to the corresponding methods, and vice versa.

Figure 1:
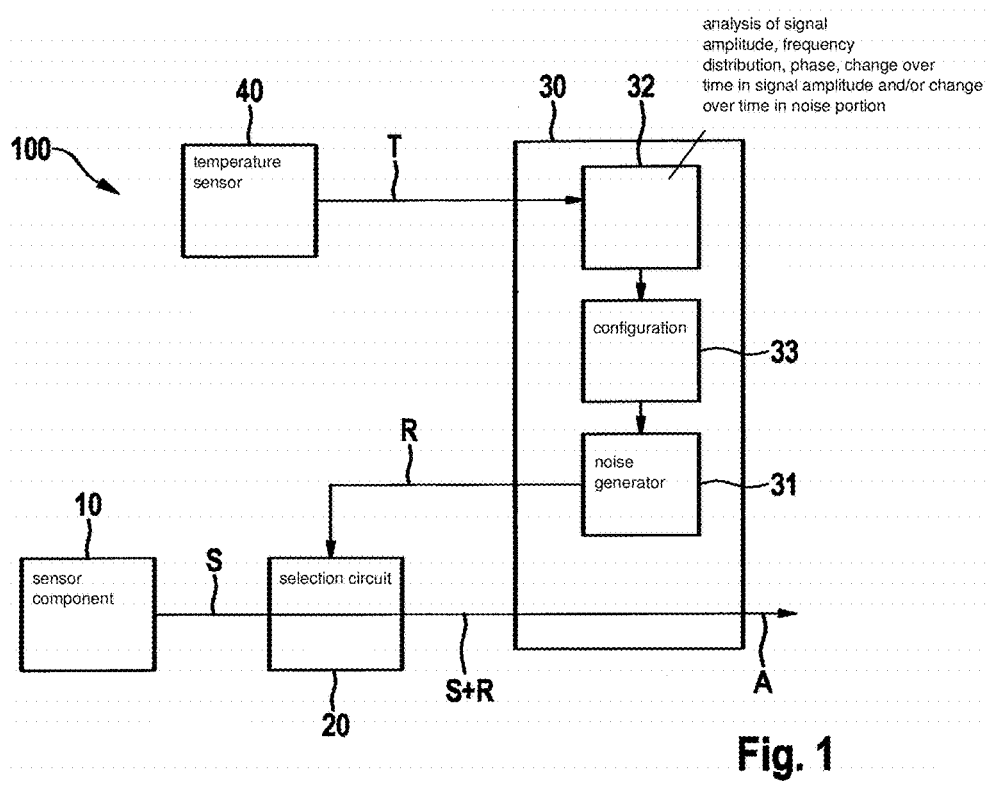
FIG. 1 is a schematic block diagram of an apparatus according to a first embodiment of the present invention.

FIG. 1 is a schematic block diagram of an apparatus 100 for processing sensor signal S of a sensor component 10, according to a first embodiment of the present invention. Apparatus 100 can encompass sensor component 10 or can be embodied for connection to sensor component 10.

In the exemplifying embodiment depicted here, sensor component 10 could be, for example, a pressure sensor having a pressure-sensitive sensor membrane. The pressure-related deflections or deformations of the sensor membrane are detected capacitively or piezoresistively and converted into an electrical sensor signal that here also constitutes the useful signal component.

Apparatus 100 encompasses a selection circuit 20 for sensor signal S, a temperature sensor 40, and a processing circuit 30 having means for generating a noise signal R that is mixed into sensor signal S.

Temperature sensor 40 can be designed to detect a temperature of sensor component 10, of selection circuit 20, of processing circuit 30, and/or of further constituents of apparatus 100 and, based thereon, to generate temperature signal T. Alternatively or additionally, temperature sensor 40 can also be designed to detect an ambient temperature.

Processing circuit 30 encompasses at least one noise generator 31 having variable operating parameters, noise signal R being generated by noise generator 31 based on the respective operating parameters that are presently chosen and set; means 32 for analyzing the properties of temperature signal T of temperature sensor 40; and configuration means 33 for choosing and setting the operating parameters of noise generator 31 as a function of the properties, ascertained by the analysis, of temperature signal T.

Means 32 can be designed to analyze a signal amplitude, a frequency distribution, a phase, a change over time in the signal amplitude, and/or a noise portion of temperature signal T, i.e., to determine corresponding properties ("temperature signal properties") of temperature signal T, based on which the choosing and setting of the operating parameters of noise generator 31 by configuration means 33 can be carried out.

In particular, a nature or properties of the generation of noise signal R (e.g., generation of pseudo-random numbers by a linear feedback shift register (LFSR) or a polynomial degree of a function for generating pseudo-random numbers), the frequency distribution of noise signal R, filter parameters for noise signal R (e.g., frequency regions to be filtered out or retained), gain factors, and/or the noise power level of noise generator 31 can be capable of being, and can be, varied by configuration means 33.

Noise signal R is delivered to selection circuit 20, where it is mixed into the analog sensor signal. The resulting signal is ultimately outputted by processing circuit 30 as an output signal A. Before that it generally also passes through further signal processing steps, for example an analog-digital conversion and/or one or several filtering operations.

Figure 2:
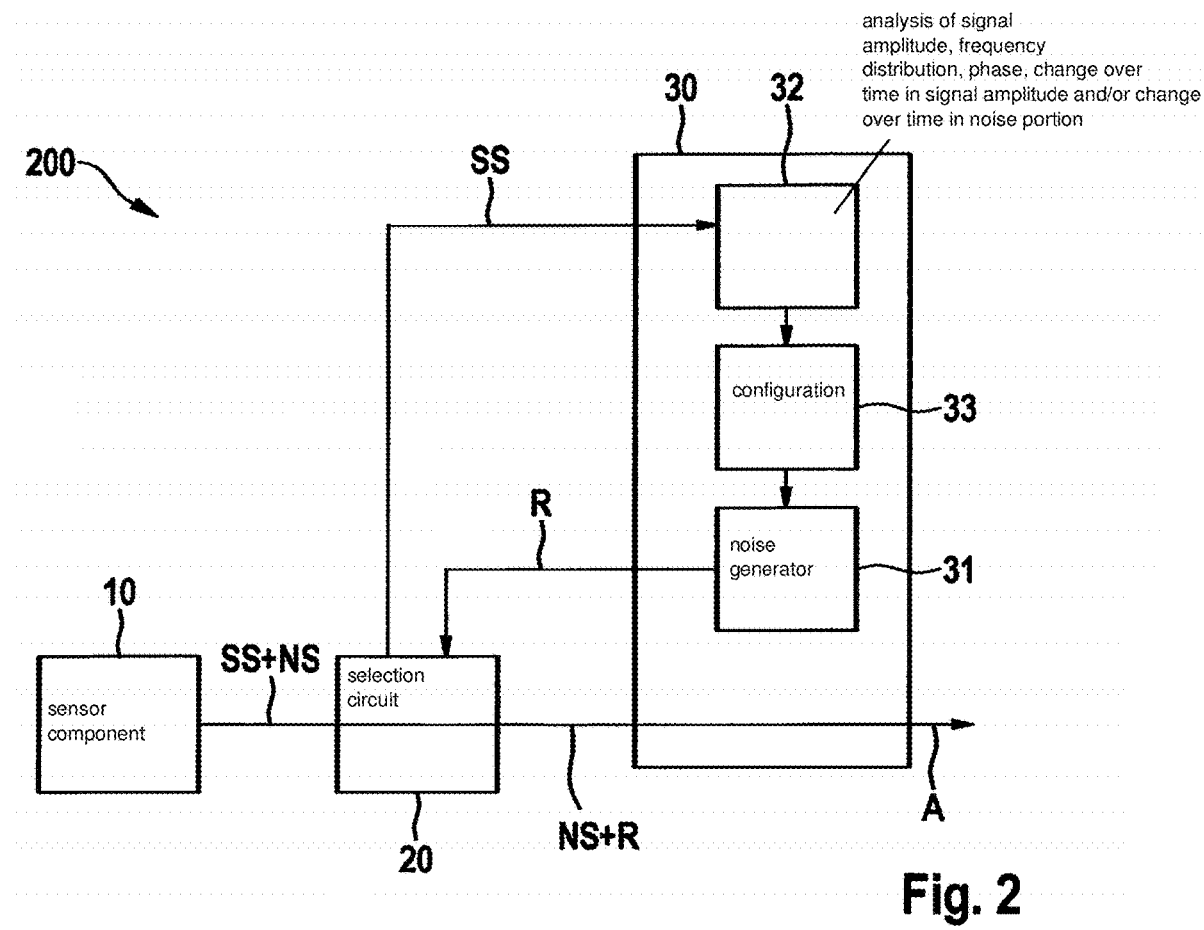
FIG. 2 is a schematic block diagram of an apparatus according to a second embodiment of the present invention.

FIG. 2 is a schematic block diagram of an apparatus 200 for processing sensor signal S of a sensor component 10, according to a second embodiment of the present invention. Apparatus 200 can encompass sensor component 10 or can be embodied for connection to sensor component 10.

In the exemplifying embodiment depicted here, sensor component 10 could be, for example, a gas sensor having a gas-sensitive electrical sensor resistor that is also dependent on temperature and moisture. The resistance value of the sensor resistor is detected as an electrical sensor signal and also encompasses, in addition to the useful signal component NS (i.e., the information regarding the gas composition of the ambient air), an interference signal component SS (i.e., the temperature and moisture influences on the sensor signal).

Apparatus 200 encompasses a selection circuit 20 for selecting or separating useful signal component NS out of sensor signal S, and for selecting or separating interference signal component SS out of sensor signal S. Apparatus 200 furthermore encompasses a processing circuit 30 having means for generating a noise signal R that is mixed into useful signal component NS.

Processing circuit 30 encompasses at least one noise generator 31 having variable operating parameters, noise signal R being generated by noise generator 31 based on the respective operating parameters that are presently chosen and set; means 32 for analyzing the properties of interference signal component SS; and configuration means 33 for choosing and setting the operating parameters of noise generator 31 as a function of the properties, ascertained by analysis, of interference signal component SS.

Means 32 can be designed to analyze a signal amplitude, a frequency distribution, a phase, a change over time in the signal amplitude, and/or a noise portion of interference signal component SS, i.e. to determine corresponding properties ("interference signal component properties") of interference signal component SS, based on which the choosing and setting of the operating parameters of noise generator 31 by configuration means 33 can be carried out.

In particular, a manner of operation or properties of noise signal R (e.g., generation of pseudo-random numbers by a linear feedback shift register (LFSR) or a polynomial degree of a function for generating pseudo-random numbers), the frequency distribution of noise signal R, filter parameters for noise signal R (e.g., frequency regions to be filtered out or retained), gain factors, and/or the noise power level of noise generator 31 can be capable of being, and can be, varied by configuration means 33.

Noise signal R is delivered to selection circuit 20, where it is mixed into the analog useful signal component NS. The resulting signal is ultimately outputted by processing circuit 30 as an output signal A. Before that it generally also passes through further signal processing steps, for example analog-digital conversion and/or one or several filtering operations.

Figure 3:
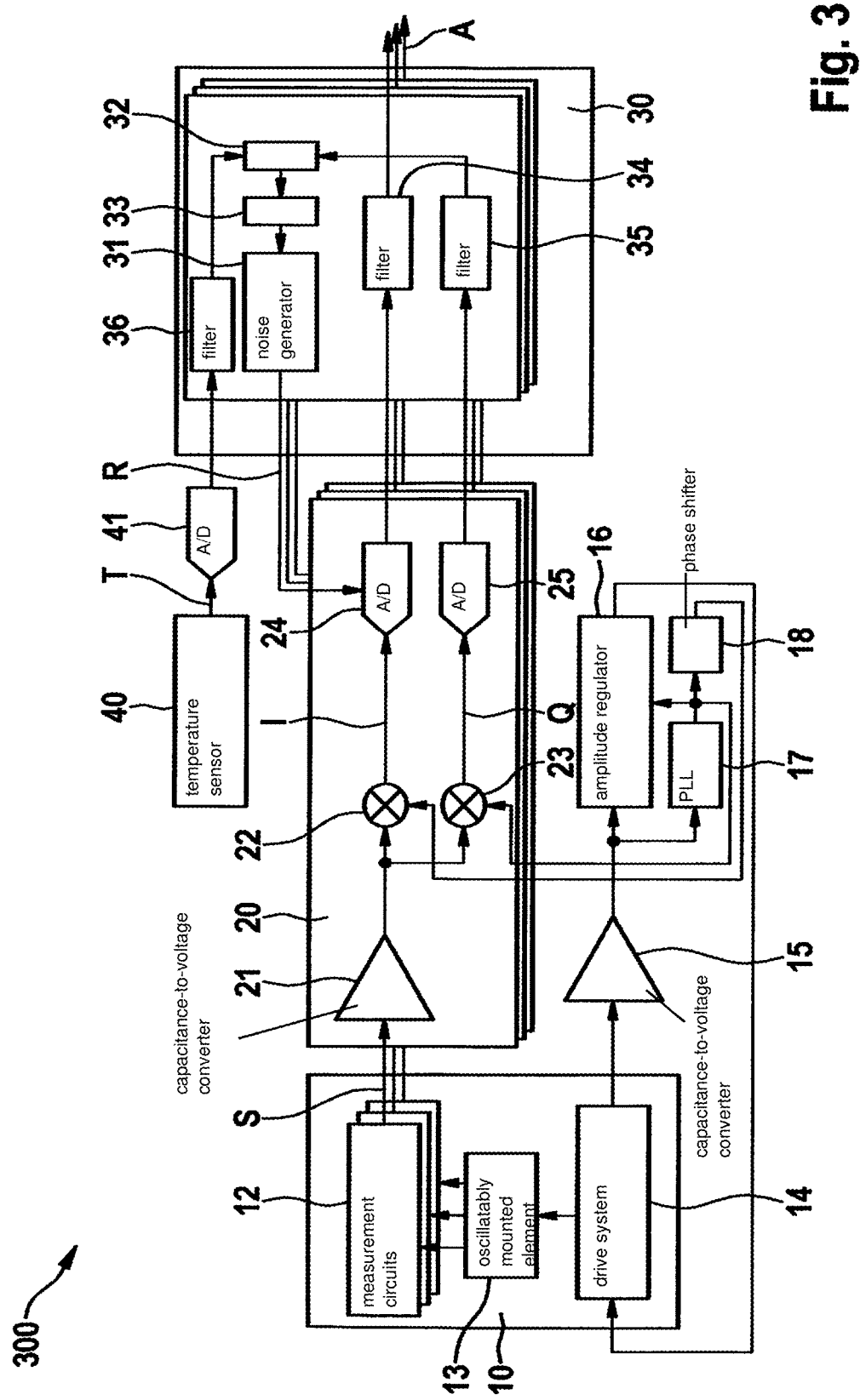
FIG. 3 is a schematic block diagram of an apparatus according to a third embodiment of the present invention.

FIG. 3 is a schematic block diagram of an apparatus 300 for processing sensor signal S of sensor component 10 of a rotation rate sensor, according to a further embodiment of the present invention. Apparatus 300 can encompass sensor component 10 or can be embodied for connection to sensor component 10.

Sensor component 10 of the rotation rate sensor described here encompasses an oscillatably mounted element 13 and a drive system 14. Oscillatably mounted element 13 is excited by drive system 14 to oscillate, in particular to oscillate sinusoidally, in a first spatial direction and then, based on the measured variable to be detected, i.e., on a rotational motion, is excited to oscillate in a second spatial direction, that second spatial direction being oriented substantially perpendicularly to the first spatial direction. This is because, as a result of the rotational motion of the sensor component, a Coriolis force acts on element 13 oscillating in the excitation direction. That Coriolis force produces a deflection or oscillation of element 13 perpendicularly to the excitation direction, that oscillation being phase-shifted 90° with respect to the excitation oscillation. In the present exemplifying embodiment the deflection, perpendicularly to the excitation direction, of oscillatably mounted element 13 is detected capacitively. The electrical signal thereby generated constitutes sensor signal S.

In the exemplifying embodiment depicted here, sensor component 10 encompasses three separate measurement circuits 12 so that motions of oscillatably mounted element 13 in all spatial directions, e.g., orthogonal spatial directions X, Y, Z, can be detected. This is indicated in FIG. 3 by three separate blocks disposed in staggered fashion. Each of these measurement circuits 12 therefore supplies a sensor signal S for the rotational motion of the sensor component in the spatial direction associated with the measurement circuit.

Be it noted at this juncture that it is also possible to provide, instead of a single oscillatably mounted element 13 having several measurement circuits 12, several oscillatably mounted elements 13 each having a separate, or one shared, measurement circuit 12.

In the exemplifying embodiment described here, each measurement circuit 12 has associated with it a separate selection circuit 20 for the respective sensor signal S, as indicated graphically in FIG. 3.

Apparatus 300 will be described below by way of example with reference to the signal path for sensor signal S of a single measurement circuit 12 of sensor component 10.

Selection circuit 20 serves to separate useful signal component I of sensor signal S, which represents the rotational motion of sensor component 10, from interference signal component Q, which is attributable to an undesired excitation of the oscillatably mounted element, for example, in the direction of the Coriolis force. This useful signal component is referred to as an "in-phase" signal I, while the interference signal component is referred to as a "quadrature" signal Q. The fact that useful signal component I is phase-shifted 90° with respect to the excitation of oscillatably mounted element 13, while interference signal component Q has the same phase as the excitation signal, is utilized in order to separate useful signal component I of the sensor signal from interference signal component Q.

In order to separate useful signal component I from interference signal component Q, firstly the capacitive sensor signal S is converted into a voltage signal with the aid of a capacitance-to-voltage converter 21 of selection circuit 20. The excitation signal of drive system 14 is furthermore converted by a further capacitance-to-voltage converter 15 of apparatus 300, after which it is made available on the one hand to an amplitude regulator 16 for regulating the excitation signal of drive system 14, and on the other hand to a phase-lock loop 17.

Phase-lock loop 17 adapts in terms of frequency and phase to the oscillating motion of oscillating element 13, and furnishes the phase information both to amplitude regulator 16 and to selection circuit 20. Amplitude regulator 16 is designed to regulate the excitation signal applied to drive system 14 in order to hold oscillatably mounted element 13 in a desired stable motion state (e.g., a sinusoidal oscillation).

Sensor signal S, converted into a voltage signal, is on the one hand mixed by a mixer 22 of selection circuit 20 with the output signal, shifted 90° by a phase shifter 18, of phase-lock loop 17 in order to select out useful signal component I; and on the other hand is mixed by a mixer 23 of selection circuit 20 with the unshifted output signal of phase-lock loop 17 in order to select out interference signal component Q.

Useful signal component I that is generated as a voltage signal is converted into a digital signal by an analog-digital converter 24 of selection circuit 20. Before that, i.e. in the signal path of useful signal component I before or at analog-digital converter 24, useful signal component I has mixed into it a noise signal R that is generated by a noise generator 31 of processing circuit 30. As indicated in FIG. 3, each useful signal component I of each of the three measurement circuits 12 can respectively have mixed into it a separate noise signal R that is respectively generated by a dedicated noise generator 31.

Analog-digital converter 24 is preferably embodied to carry out a delta-sigma modulation. The digitized useful signal component I passes through a filter 34 of processing circuit 30, for example a low-pass filter, and is then outputted from processing circuit 30 as an output signal A. As indicated in FIG. 3, in this case processing circuit 30 supplies three output signals A that respectively represent the rotation rate of sensor component 10 in one spatial direction.

Interference signal component Q, generated as a voltage signal, is converted into a digital signal by an analog-digital converter 25 of selection circuit 20, and is directed through a filter 35 of processing circuit 30, for example a low-pass filter. The resulting signal, which still encompasses interference signal component Q as information, is directed to means 32 of processing circuit 30 for analyzing the properties of interference signal component Q.

Means 32 are designed to determine at least one property of interference signal component Q, for example a signal amplitude, a frequency distribution, a phase, a change over time in the signal amplitude, and/or a noise portion of interference signal component Q, for example as has already been explained with reference to FIG. 2.

Apparatus 300 furthermore encompasses a temperature 40 as has been described with reference to FIG. 1. After it has been analog-digital converted by an analog-digital converter 41, temperature signal T of temperature sensor 40 is filtered through a filter 36 of processing circuit 30 and then also directed to means 32. Means 32 are designed to determine at least one property of temperature signal T, for example a signal amplitude, a frequency distribution, a phase, a change over time in the signal amplitude, and/or a noise portion of temperature signal T, for example as has already been explained with reference to FIG. 1.

Processing circuit 30 encompasses configuration means 33 for choosing and setting the operating parameters of noise generator 31 as a function of the properties, ascertained by means 32, of both interference signal component Q and temperature signal T.

For example, a noise signal R having a comparatively lower amplitude can be generated by noise generator 31 in the context of a comparatively higher amplitude of interference signal component Q. Similarly, for example, a noise signal R having a comparatively lower amplitude can be generated in the context of a comparatively higher temperature.

With the aid of configuration means 33, it is possible in particular to vary the manner in which the noise signal is generated, the frequency distribution of noise signal R, a filter parameter for the noise signal (e.g. filter band limits of a high-pass filter, bandpass filter, and/or low-pass filter), gain factors, and/or the noise power level of noise generator 31.

Figure 4:
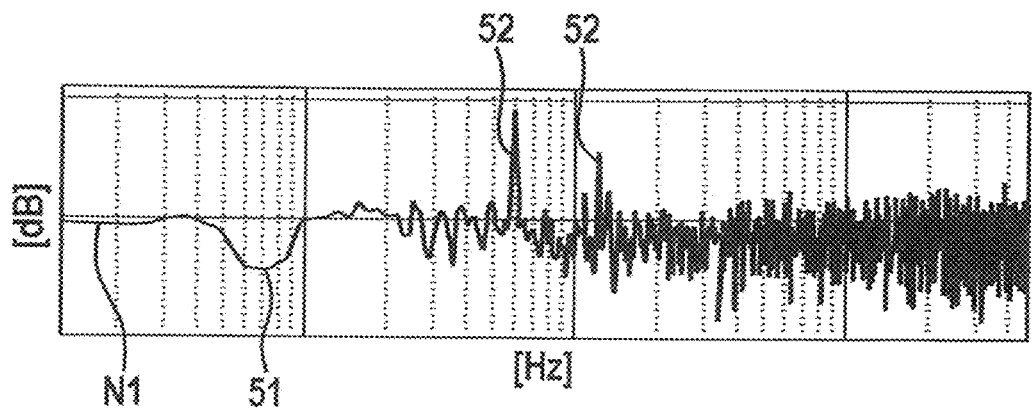
FIG. 4 shows an example of the frequency spectrum of the noise component of the useful signal component of a sensor signal prior to addition of a noise signal generated in accordance with the present invention.
Figure 5:
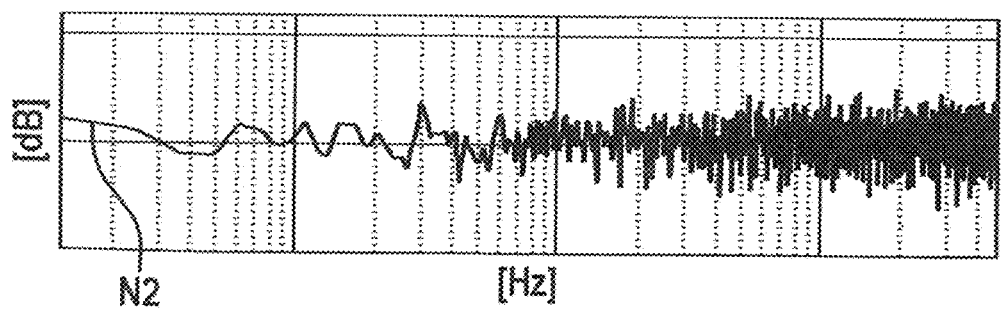
FIG. 5 shows a frequency spectrum of the noise component of the useful signal component of a sensor signal after addition of a noise signal according to embodiments of the present invention.

For better comprehension, FIGS. 4 and 5 show schematic frequency spectra of a noise component N of a sensor signal S. Noise component N, shown by way of example, can correspond exactly to interference component Q, can represent a part of interference signal component Q, or can encompass interference signal component Q. Both FIG. 4 and FIG. 5 show graphs whose abscissa represents a frequency in hertz (Hz) and whose ordinate represents a power level expressed by a gain of a reference value in decibels (dB).

FIG. 4 shows an example of the frequency spectrum of noise component N1 of a typical in-phase signal I of a rotation rate sensor as described in conjunction with FIG. 3, specifically before a noise signal generated according to the present invention has been mixed in. The frequency spectrum of noise component N1 exhibits large deviations 51 from an average value, as well as individual "outliers" or peaks 52 that represent local maxima of the power density.

FIG. 5 shows the frequency spectrum of noise component N2 of in-phase signal I of the same rotation rate sensor, after addition of a noise signal R in accordance with embodiments of the present invention, e.g., by way of one of apparatuses 100; 200; 300. It is evident from FIG. 5 that the frequency spectrum of noise component N2 is now closer to white noise, while the noise power level as a whole is slightly elevated as compared with noise component N1 depicted in FIG. 4.

Although the present invention has been described above with reference to preferred exemplifying embodiments, it is not limited thereto but instead is modifiable in many ways. In particular, the invention can be changed or modified in a multiplicity of ways without deviating from the essence of the invention.

What is claimed is:

1. An apparatus for processing a sensor signal of a sensor component, the sensor signal encompassing at least one useful signal component, the apparatus comprising:
   a selection circuit for the useful signal component;
   a temperature sensor; and
   a processing circuit configured to generate a noise signal that is mixed into the at least one useful signal component;
   wherein the processing circuit includes:
   a noise generator having variable operating parameters; and
   an analyzer configured to analyze the properties of a temperature signal of the temperature sensor; and
   configuration unit for choosing and setting the operating parameters of the noise generator as a function of the properties of the temperature signal,
   wherein the variable operating parameters include the manner in which the noise signal is generated which is based on at least one of the temperature signal and at least one interference signal component when the operating parameters of the noise generator are chosen and/or set, gain factors, and/or the noise output power of the noise generator each of which is variable with the aid of the configuration unit.

2. An apparatus for processing a sensor signal of a sensor component, the sensor signal encompassing at least one useful signal component and at least one interference signal component, the apparatus comprising:
   a selection circuit configured for separating the at least one useful signal component from the at least one interference signal component; and
   a processing circuit configured for generating a noise signal that is mixed into the at least one useful signal component;
   wherein the processing circuit includes:
   a noise generator having variable operating parameters; and
   an analyzer configured for analyzing the properties of the interference signal component; and
   configuration unit for choosing and setting the operating parameters of the noise generator as a function of the properties of the interference signal component,
   wherein the variable operating parameters include the manner in which the noise signal is generated which is based on at least one of a temperature signal and the at least one interference signal component when the operating parameters of the noise generator are chosen and/or set, gain factors, and/or the noise output power of the noise generator each of which is variable with the aid of the configuration unit.

3. The apparatus as recited in claim 1, wherein the configuration unit of the processing circuit are designed to take into account both the properties of the temperature signal and properties of an interference signal component when choosing and/or setting the operating parameters of the noise generator.

4. The apparatus as recited in claim 1, further comprising:
   at least one analog-digital converter for the useful signal component;
   wherein mixing of the noise signal generated by the noise generator into the useful signal component occurs in the signal flow before or at the analog-digital converter.

5. The apparatus as recited in claim 1, wherein the analyzer is configured to analyze the signal amplitude, frequency distribution, phase, change over time in the signal amplitude, and/or the noise portion of the temperature signal and/or a noise portion of an interference signal component.

6. A method for processing the sensor signal of a sensor component, the sensor signal including at least one useful signal component, the method comprising:
   detecting a temperature signal in parallel with the sensor signal;
   analyzing the temperature signal;
   generating a noise signal as a function of signal properties of the temperature signal; and
   mixing the noise signal into the useful signal component,
   wherein the variable operating parameters include the manner in which the noise signal is generated which is based on at least one of the temperature signal and at least one interference signal component when the operating parameters of the noise generator are chosen and/or set, gain factors, and/or the noise output power of the noise generator each of which is variable with the aid of the configuration unit.

7. A method for processing a sensor signal of a sensor component, the sensor signal including at least one useful signal component and at least one interference signal component, the method comprising:
   separating the at least one useful signal component and the at least one interference signal component;
   analyzing the at least one interference signal component;
   generating a noise signal as a function of the properties of the at least one interference signal component; and
   mixing the noise signal into the useful signal component,
   wherein the variable operating parameters include the manner in which the noise signal is generated which is based on at least one of a temperature signal and the at least one interference signal component when the operating parameters of the noise generator are chosen and/or set, gain factors, and/or the noise output power of the noise generator each of which is variable with the aid of the configuration unit.

8. The method as recited in claim 6, wherein both the properties of the temperature signal and properties of at least one interference signal component are taken into account upon generation of the noise signal.

9. The method as recited in claim 7, further comprising:
   analog-digital converting at least one useful signal component s analog-digital converted;
   wherein the noise signal is mixed into the useful signal component before the analog-digital conversion.

10. The apparatus as recited in claim 1, wherein the variable operating parameters further include the frequency distribution of the noise signal.

* * * * *